United States Patent
Ikeuchi

(10) Patent No.: US 12,500,612 B2
(45) Date of Patent: Dec. 16, 2025

(54) RADIO FREQUENCY SYSTEM WITH PARALLEL ACOUSTIC WAVE FILTERS

(71) Applicant: Skyworks Solutions, Inc., Irvine, CA (US)

(72) Inventor: Satoru Ikeuchi, Ashiya (JP)

(73) Assignee: Skyworks Solutions, Inc., Irvine, CA (US)

( * ) Notice: Subject to any disclaimer, the term of this patent is extended or adjusted under 35 U.S.C. 154(b) by 385 days.

(21) Appl. No.: 18/147,318

(22) Filed: Dec. 28, 2022

(65) Prior Publication Data

US 2023/0223963 A1   Jul. 13, 2023

Related U.S. Application Data

(60) Provisional application No. 63/298,480, filed on Jan. 11, 2022, provisional application No. 63/298,541, filed on Jan. 11, 2022.

(51) Int. Cl.
| | |
|---|---|
| *H04B 1/00* | (2006.01) |
| *H03H 9/25* | (2006.01) |
| *H03H 9/60* | (2006.01) |
| *H03H 9/64* | (2006.01) |
| *H03H 9/70* | (2006.01) |
| *H03H 9/72* | (2006.01) |
| *H04M 1/02* | (2006.01) |

(52) U.S. Cl.
CPC ............. *H04B 1/0057* (2013.01); *H03H 9/25* (2013.01); *H03H 9/605* (2013.01); *H03H 9/6483* (2013.01); *H03H 9/703* (2013.01); *H03H 9/72* (2013.01); *H03H 9/725* (2013.01); *H04M 1/026* (2013.01); *H04M 2250/10* (2013.01)

(58) Field of Classification Search
CPC ........ H04B 1/0057; H03H 9/25; H03H 9/605; H03H 9/6483; H03H 9/703; H03H 9/72; H03H 9/725; H04M 1/026; H04M 2250/10
USPC ...................................... 455/552.1
See application file for complete search history.

(56) References Cited

U.S. PATENT DOCUMENTS

| | | | |
|---|---|---|---|
| 5,666,092 A | 9/1997 | Yamamoto et al. | |
| 6,606,016 B2 | 8/2003 | Takamine | |
| 9,837,983 B2* | 12/2017 | Xu | ........................ H03H 9/568 |
| 2008/0224790 A1* | 9/2008 | Tajima | .................. H03H 9/008 333/133 |
| 2011/0187479 A1* | 8/2011 | Takamine | ............ H03H 9/0061 333/133 |
| 2013/0122829 A1 | 5/2013 | Hyvonen et al. | |
| 2018/0123547 A1 | 5/2018 | Kato et al. | |
| 2020/0028492 A1* | 1/2020 | Ta | ........................ H03H 9/6483 |

(Continued)

OTHER PUBLICATIONS

U.S. Appl. No. 18/147,225, filed Dec. 28, 2022, Parallel Acoustic Wave Filters.

*Primary Examiner* — Michael R Neff
(74) *Attorney, Agent, or Firm* — Knobbe, Martens, Olson & Bear, LLP

(57) ABSTRACT

Aspects of this disclosure relate to a radio frequency system with an antenna, a radio frequency amplifier, and parallel acoustic wave filters. The parallel acoustic wave filters can each be a band pass filter having a passband and resonator area. The passbands of the parallel acoustic filters can be overlap in an overlap band. One of the parallel acoustic wave filters can have a smaller resonator area than another of the parallel acoustic wave filters.

20 Claims, 11 Drawing Sheets

(56) References Cited

U.S. PATENT DOCUMENTS

| | | | |
|---|---|---|---|
| 2020/0153412 A1 | 5/2020 | Nosaka | |
| 2020/0212889 A1* | 7/2020 | Omura | H03H 9/02992 |
| 2021/0313962 A1* | 10/2021 | Sugaya | H03H 9/0523 |
| 2023/0223930 A1* | 7/2023 | Ikeuchi | H03H 9/703 |
| | | | 455/550.1 |

* cited by examiner

RADIO FREQUENCY SYSTEM WITH PARALLEL ACOUSTIC WAVE FILTERS

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/298,480, filed Jan. 11, 2022 and titled "PARALLEL ACOUSTIC WAVE FILTERS," and U.S. Provisional Application No. 63/298,541, filed Jan. 11, 2022 and titled "RADIO FREQUENCY SYSTEM WITH PARALLEL ACOUSTIC WAVE FILTERS," the disclosures of each of which are hereby incorporated by reference in their entireties and for all purposes.

BACKGROUND

Technical Field

Embodiments of this disclosure relate to acoustic wave filters.

Description of Related Technology

An acoustic wave filter can include a plurality of resonators arranged to filter a radio frequency signal. Examples of acoustic wave resonators include surface acoustic wave (SAW) resonators and bulk acoustic wave (BAW) resonators. A surface acoustic wave resonator can include an interdigital transductor electrode on a piezoelectric substrate. The surface acoustic wave resonator can generate a surface acoustic wave on a surface of the piezoelectric layer on which the interdigital transductor electrode is disposed. In BAW resonators, acoustic waves propagate in a bulk of a piezoelectric layer. Example BAW resonators include film bulk acoustic wave resonators (FBARs) and solidly mounted resonators (SMRs).

Acoustic wave filters can be implemented in radio frequency electronic systems. For instance, filters in a radio frequency front end of a mobile phone can include acoustic wave filters. An acoustic wave filter can be a band pass filter. A plurality of acoustic wave filters can be arranged as a multiplexer. For example, two acoustic wave filters can be arranged as a duplexer. An acoustic wave filter with a relatively wide passband can be desirable.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is an acoustic wave filter that includes a first acoustic wave filter and a second acoustic wave filter. The first acoustic wave filter includes a first passband. The second acoustic wave filter includes a second passband. The second acoustic wave filter is parallel with the first acoustic wave filter, and the second passband includes frequencies above the first passband. The first passband and the second passband are overlapping in an overlap band, and the first acoustic wave filter has a higher impedance in the overlap band than the second acoustic wave filter.

The first acoustic wave filter and the second acoustic wave filter each include a wave resonator area. The wave resonator area in the first acoustic wave filter can have a smaller acoustic wave resonator area than the wave resonator area of the second acoustic wave filter.

The first acoustic wave filter and the second acoustic wave filter can include first wave resonators and second wave resonators, respectively. The second acoustic wave resonators can have a capacitance greater than the combined capacitance of the first acoustic wave resonators of the first acoustic wave filter.

The first acoustic wave filter can include a multimode surface acoustic wave filter and a plurality of acoustic wave resonators. Additionally, the plurality of acoustic wave resonators can include a surface acoustic wave resonator.

The first acoustic wave filter can include a bulk acoustic wave resonator. Alternatively or additionally, the first acoustic wave filter can include a surface acoustic wave resonator.

At least one of the first passband of the first acoustic wave filter and the second passband of the second acoustic wave filter can be associated with a Global Positioning System (GPS) frequency band.

The acoustic wave filter can also include a third acoustic wave filter in parallel with the first and second acoustic wave filters. The third acoustic wave filter can have a third passband that overlaps with the second passband.

Another aspect of this disclosure is a radio frequency module that includes a first acoustic wave filter, a second acoustic wave filter, and radio frequency circuitry. The first acoustic wave filter includes a first passband. The second acoustic wave filter includes a second passband. The second acoustic wave filter is in parallel with the first acoustic wave filter, and the second passband includes frequencies above the first passband. The first passband and the second passband are overlapping in an overlap band, and the first acoustic wave filter has a higher impedance in the overlap band than the second acoustic wave filter. The radio frequency circuitry is coupled to the first and second acoustic wave filters. The first and second acoustic wave filters and the radio frequency circuit element are enclosed within a common package.

The radio frequency circuitry can include a switch. Alternatively or additionally, the radio frequency circuitry can include is a radio frequency amplifier.

The first acoustic wave filter and the second acoustic wave filter each include wave resonator area. The wave resonator area in the first acoustic wave filter can have a smaller acoustic wave resonator area than the wave resonator area of the second acoustic wave filter.

The first acoustic wave filter and the second acoustic wave filter can include first wave resonators and second wave resonators, respectively. The second acoustic wave resonators can have a capacitance greater than the combined capacitance of the first acoustic wave resonators of the first acoustic wave filter.

The first acoustic wave filter can include a multimode surface acoustic wave filter and a plurality of acoustic wave resonators. Additionally, the plurality of acoustic wave resonators can include a surface acoustic wave resonator.

The first acoustic wave filter can include a bulk acoustic wave resonator. Alternatively or additionally, the first acoustic wave filter can include a surface acoustic wave resonator.

At least one of the first passband of the first acoustic wave filter or the second passband of the second acoustic wave filter can be associated with a Global Positioning System (GPS) frequency band.

The radio frequency module can also include a third acoustic wave filter in parallel with the first and second acoustic wave filters. The third acoustic wave filter can have a third passband that overlaps with the second passband.

Another aspect of this disclosure is a radio frequency system that includes an antenna, a radio frequency amplifier, a first acoustic wave filter, and a second acoustic wave filter. The first acoustic wave filter includes a first passband and a first acoustic wave resonator area. The first acoustic wave filter is in a signal path between the antenna and the radio frequency amplifier. The second acoustic wave filter includes a second passband and a second acoustic wave resonator area. The second acoustic wave filter is positioned in parallel with the first acoustic wave filter, and the second passband includes frequencies above the first passband. The first passband and the second passband are overlapping in an overlap band, and the first acoustic wave resonator area is being smaller than the second acoustic wave resonator area. Additionally, the radio frequency system can include a transceiver in communication with the radio frequency amplifier.

The radio frequency amplifier can be a low noise amplifier. Alternatively, the radio frequency amplifier can be a power amplifier.

The first acoustic wave filter can have a higher impedance in the overlap band than the second acoustic wave filter.

Another aspect of this disclosure is a radio frequency system that includes an antenna, a radio frequency amplifier, a transceiver, a first acoustic wave filter, and a second acoustic wave filter. The first acoustic wave filter includes a first passband and a first acoustic wave resonator area. The first acoustic wave filter is in a signal path between the antenna and the radio frequency amplifier. The second acoustic wave filter includes a second passband and a second acoustic wave resonator area. The second acoustic wave filter is positioned in parallel with the first acoustic wave filter, and the second passband includes frequencies above the first passband. The first passband and the second passband are overlapping in an overlap band, and the first acoustic wave resonator area is smaller than the second acoustic wave resonator area. The transceiver is configured to communicate with the radio frequency amplifier.

The wireless communication device can be a mobile phone. The first acoustic wave filter and/or the second acoustic wave filter can be configured to filter a Global Positioning System (GPS) signal received by the antenna. The wireless communication device can be configured to transmit a fifth generation New Radio signal from the antenna. The wireless communication device can be configured to implement dual connectivity.

Another aspect of this disclosure is a wireless communication devices that includes an acoustic wave filter in accordance with any suitable principles and advantages disclosed herein, an antenna operatively coupled to the acoustic wave filter, a radio frequency amplifier coupled to the acoustic wave filter and configured to amplify a radio frequency signal, and a transceiver in communication with the radio frequency amplifier.

Another aspect of this disclosure is a method of filtering a radio frequency signal. The method includes receiving a radio frequency signal at a port of an acoustic wave filter in accordance with any suitable principles and advantages disclosed herein and filtering the radio frequency signal with the acoustic wave filter.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

The present disclosure relates to U.S. patent application Ser. No. 18/147,225, titled "PARALLEL ACOUSTIC WAVE FILTERS," filed on even date herewith, the entire disclosure of which is hereby incorporated by reference herein and for all purposes.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
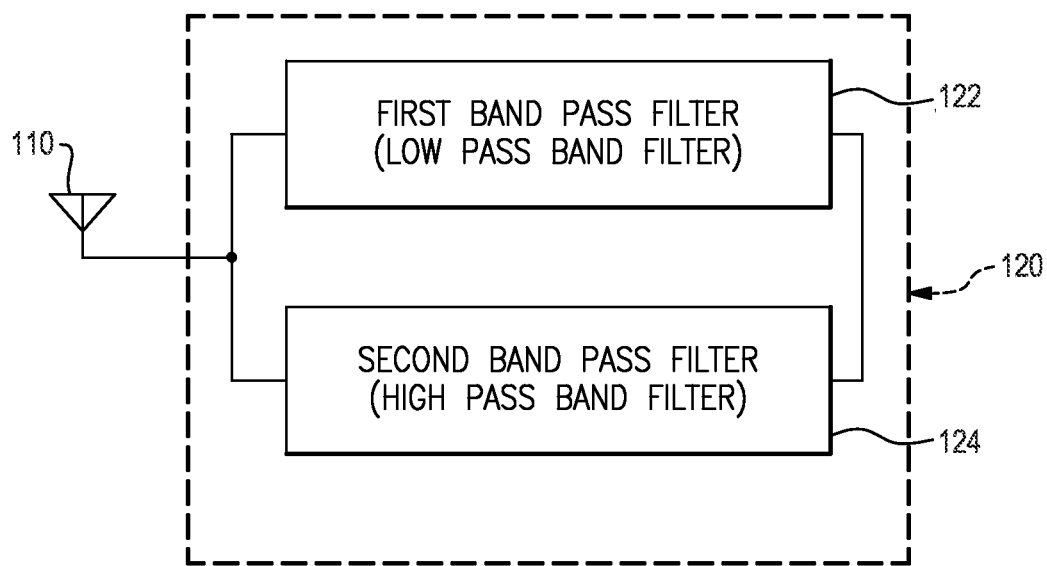
FIG. 1A is a schematic block diagram of the parallel acoustic wave filters according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. Any suitable principles and advantages of the embodiments disclosed herein can be implemented together with each other.

As the demand for processing wideband signals increases, a band pass filter with a wide passband is desired. However, developing the band pass filter with a wide passband can be challenging. Two filters can be connected in parallel with each other to implement a wideband filter. The two filters can be designed to have the same impedance (e.g., 50 Ohms), and these impedances can be matched throughout the entire passband. However, this can result in the capacitance of one of the two filters with a lower frequency passband having a relatively large capacitance. Thus, the different capacitances in the passbands of these two filters can be adjusted to match their impedance throughout the band pass's entire passband. Furthermore, the band pass filter's (e.g., wide band pass filter's) form factor can be increased due to the impedance matching over the passband by adding a capacitance to the one or both of the filters to match the impedance over the entire passband. This can cause packaging constraints for the filter components and other components included in the same module as the filter components.

Embodiments of this disclosure relate to a band pass filter that includes parallel acoustic wave filters. The parallel acoustic wave filters function as a band pass filter. By connecting a plurality of acoustic wave filters in parallel with each other, the parallel acoustic wave filters can have a wide passband. The parallel acoustic wave filters include a first acoustic wave filter with a lower passband and a second acoustic wave filter with a higher passband, where the lower passband and the higher passband overlap with each other. The first acoustic wave filter with the lower passband has a higher impedance than the second acoustic wave filter in the frequency range where the lower passband and the higher passband overlap. The average capacitance of the acoustic wave resonators of the first acoustic wave filter can be smaller than the average capacitance of the acoustic wave resonators of the second acoustic wave filter. The first acoustic wave filter can have a smaller acoustic wave resonator area than the second acoustic wave filter.

In the overlapping frequency range where the lower passband and the higher passband overlap, the impedance of an antenna and the band pass filters connected in parallel can be mismatched. If the impedances are not matched, each band pass filter may not be tuned. Thus, each parallel acoustic wave filter can have at least one frequency range that is not matched with the antenna impedance. The unmatched impedance for overlapping frequency range can result in a smaller physical area of the parallel acoustic wave filters. In some instances, any impedance tuning by adding capacitance to the band pass filter may not be needed.

The first acoustic wave filter can include one or more of a multimode surface acoustic wave (MMS) filter, one or more bulk acoustic wave (BAW) resonators, one or more surface acoustic wave (SAW) resonators, or any suitable combination thereof. An MMS filter can include a plurality of interdigital transduce electrodes that are longitudinally coupled to each other and acoustic reflectors on opposing sides of the plurality of interdigital transducer electrodes. MMS filters are sometimes referred to as double mode SAW (DMS) filters. In some instances, the first acoustic wave filter includes an MMS filter and a plurality of SAW resonators. The second acoustic wave filter can include one or more of a MMS filter, one or more BAW resonators, or one more SAW resonators. In some instances, the second acoustic wave filter includes an MMS filter and a plurality of SAW resonators.

In one embodiment, parallel acoustic wave filters can include three or more band pass filters. For example, three band pass filters in parallel can implement a wider passband than two parallel band pass filters. There can be overlapping frequency regions between the three parallel filters. Each of the band pass filters may not match its respective impedance with the antenna in a frequency region that overlaps with the passband of one other band pass filter.

In some embodiments, the parallel acoustic wave filters are integrated into an antenna side of a radio frequency (RF) front end system, where the antenna is connected. For example, the input of the parallel acoustic wave filters can be connected to the antenna, and an output of the parallel acoustic wave filters can be connected to the RF front end. In some instances, the input and output may be switched based on their application. For example, the input can be a port connected to the antenna in a receiving mode. The input can be a port connected to the RF front end system in a transmitting mode. The parallel acoustic wave filters are connected to a power amplifier. Alternatively or additionally, the parallel acoustic wave filters can be connected to a low noise amplifier.

Using the parallel acoustic wave filters disclosed herein can increase the frequency range of the passband. At the same time, the band pass filter can be implemented with a relatively small area. Increasing the passband can be beneficial in mobile device applications that have a need for a wider passband.

FIG. 1A is a schematic block diagram of a parallel acoustic wave filter 120 that is in communication with an antenna 110. The parallel acoustic wave filter 120 is a band pass filter. In a receive mode, a signal from antenna 110 is filtered by the parallel acoustic wave filter 120 and provided to radio frequency front end circuitry. In a transmit mode, a signal generated by a radio frequency front end is filtered by the parallel acoustic wave filter 120 and then transmitted via the antenna 110. The parallel acoustic wave filter 120 can filter out frequency content outside of its passband, such as channel noise, interfering signal(s), out of band signal(s), or the like. In an embodiment, the parallel acoustic wave filter 120 has a passband corresponding to a Global Positioning System (GPS) frequency band.

As shown in FIG. 1A, the parallel acoustic wave filter 120 includes a first band pass filter 122 connected in parallel with a second band pass filter 124. The first band pass filter 122 has a lower passband and the second band pass filter 124 has a higher passband, where the lower passband and the higher passband overlap with each other. Together, the first band pass filter 122 and the second band pass filter 124 create a relatively wide passband that includes the lower passband and the higher passband. The band pass filters 122 and 124 can each be acoustic wave filters that include acoustic wave devices. The band pass filters 122 and 124 can each include any suitable acoustic wave devices, such as one or more MMS filters, one or more SAW resonators, one or more BAW resonators, or any suitable combination thereof. The one or more SAW resonators can include a temperature compensated SAW resonator, a non-temperature compensated SAW resonator, a multilayer piezoelectric substrate SAW resonator, or any suitable combination thereof. The one or more BAW resonators can include a film bulk acoustic wave resonators (FBAR) and/or a BAW solidly mounted resonator (SMR).

Figure 1B:
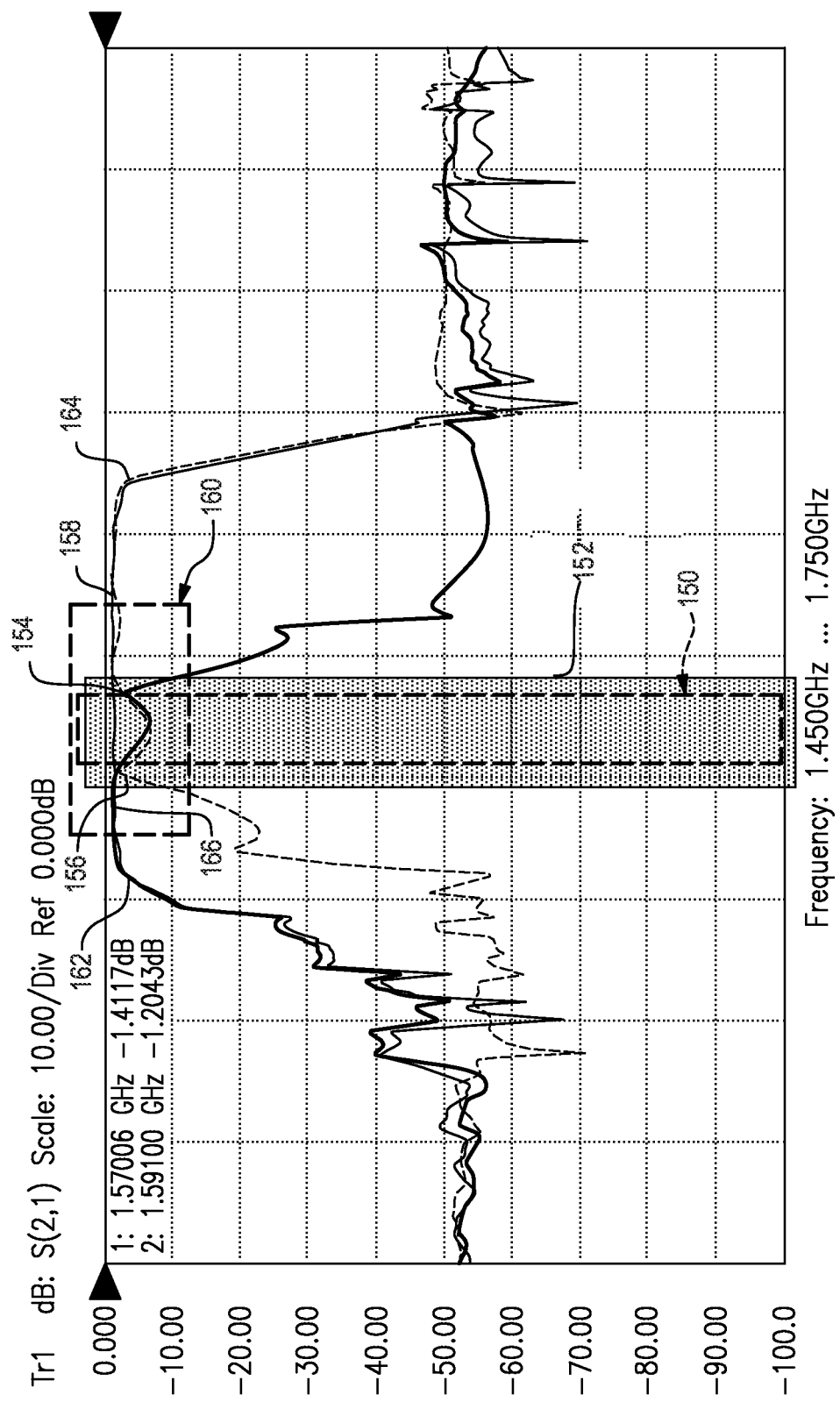
FIG. 1B is a graph of an insertion loss for the parallel acoustic wave filters of FIG. 1A.

FIG. 1B illustrates a frequency response of the band pass filters 122 and 124 and the combined parallel acoustic wave filter 120. Referring to FIG. 1B, the first band pass filter 122 has a lower center frequency 166 than the center frequency 158 of the second band pass filter 124. The first band pass filter 122 has a passband between the first lower cutoff frequency 162 and a first upper cutoff frequency 154. The second band pass filter 124 has a passband between a second lower cutoff frequency 156 and a second upper cutoff frequency 164. In FIG. 1B, an overlapping frequency region 152 covers the second lower cutoff frequency 156 and the first upper cutoff frequency 154. The parallel acoustic wave filter 120 has a frequency response corresponding to the combined frequency responses of the first and second band pass filters 122 and 124, respectively. Accordingly, the additive frequency response of the first and second band pass filters 122 and 124, respectively, in the overlapping frequency region 152 makes up the frequency response of the parallel acoustic wave filter 120 in the middle part of its passband.

The band pass filters 122 and 124 can each have an impedance that is mismatched with the antenna 110 in the overlapping frequency region 152. The overlapping frequency region 152 is a frequency region where the respective passbands of the band pass filters 122, 124 overlapped. As shown in FIG. 1B, for example, each of the band pass filters 122 and 124 can be designed with mismatched impedance with the antenna 110 at the frequency region 150, where the mismatched impedance frequency region 150 is within the overlapping frequency region 152. In this example, the impedances of the antenna 110 and the band pass filters 122 and 124 are mismatched at the mismatched impedance frequency region 150, between 1.57 GHz and 1.59 GHz. The mismatched impedance frequency region 150 may have a ripple area 160. The impedances of the band pass filters 122 and 124 can be selected such that there is a small band ripple in the overlap region 152. Accordingly, the parallel acoustic wave filter 120 can have a relatively flat passband in the frequency domain.

Figure 1D:
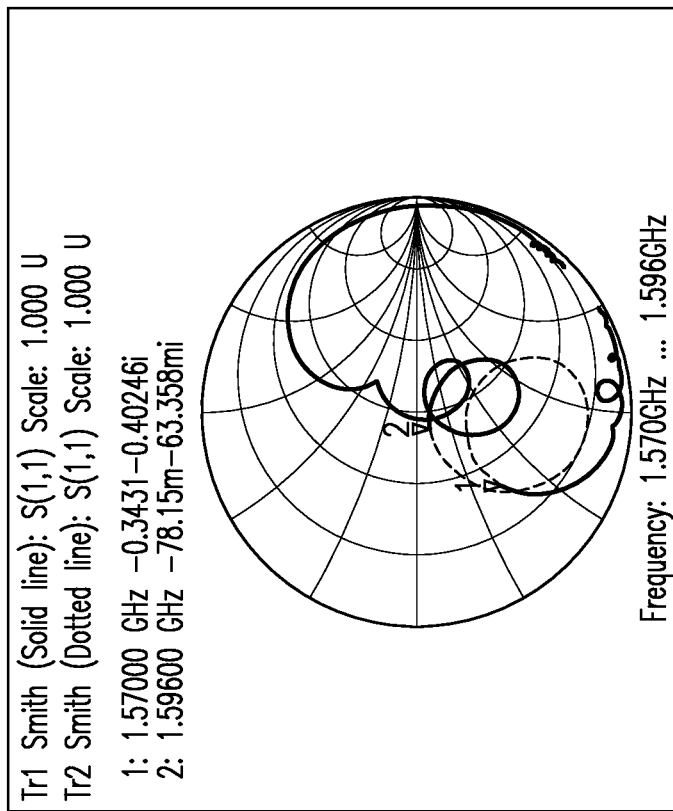
FIG. 1D is a Smith chart of the second band pass filter in FIG. 1A.
Figure 1C:
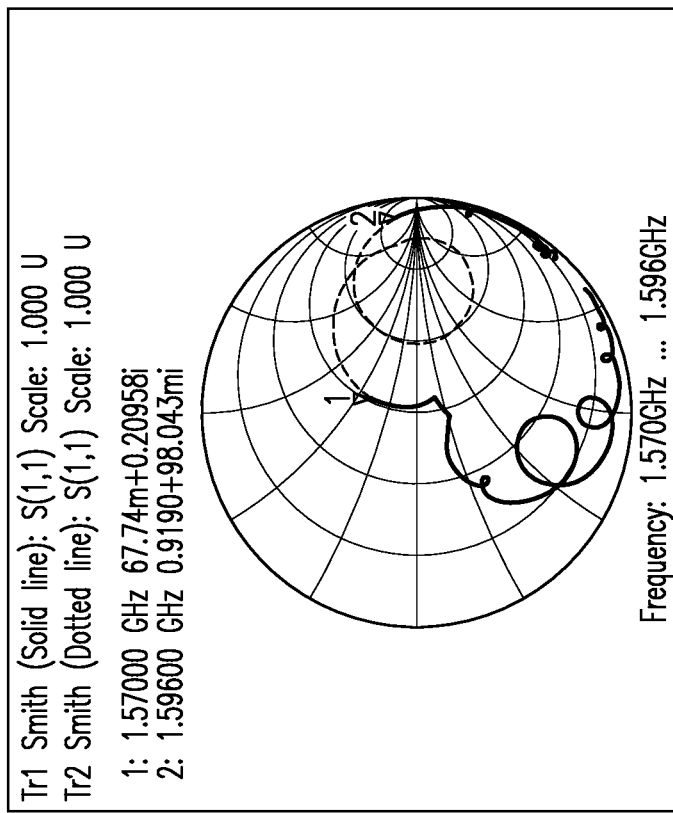
FIG. 1C is a Smith chart for the first band pass filter in FIG. 1A.

FIGS. 1C and 1D are Smith charts that illustrate impedances of the band pass filters 122 and 124, respectively, at different frequencies. As shown in FIGS. 1C and 1D, the impedances of the first and second band pass filters 122, 124 are mismatched with the antenna 110 at the mismatched impedance frequency region 150, between 1.57 GHz and 1.59 GHz.

As shown in FIG. 1C, the first band pass filter 122 has an inductive reactance. To match the first band pass filter 122 at the mismatched impedance frequency region 150, the phase can be shifted by increasing capacitance. However, since the first band pass filter 122 does not need impedance matching with the antenna 110 in the mismatched impedance frequency region 150, the first band pass filter 122 can be implemented without adding any capacitance. Thus, the first band pass filter 122 has a higher impedance in the overlapping frequency region.

As shown in FIG. 1D, the second band pass filter 124 has a capacitive reactance at the mismatched impedance frequency region 150. Since the second band pass filter 124 does not need to match its impedance in the mismatched impedance frequency region 150, the second band pass filter 124 can also be implemented without impedance tuning for the mismatched impedance frequency region 150.

Figure 2:
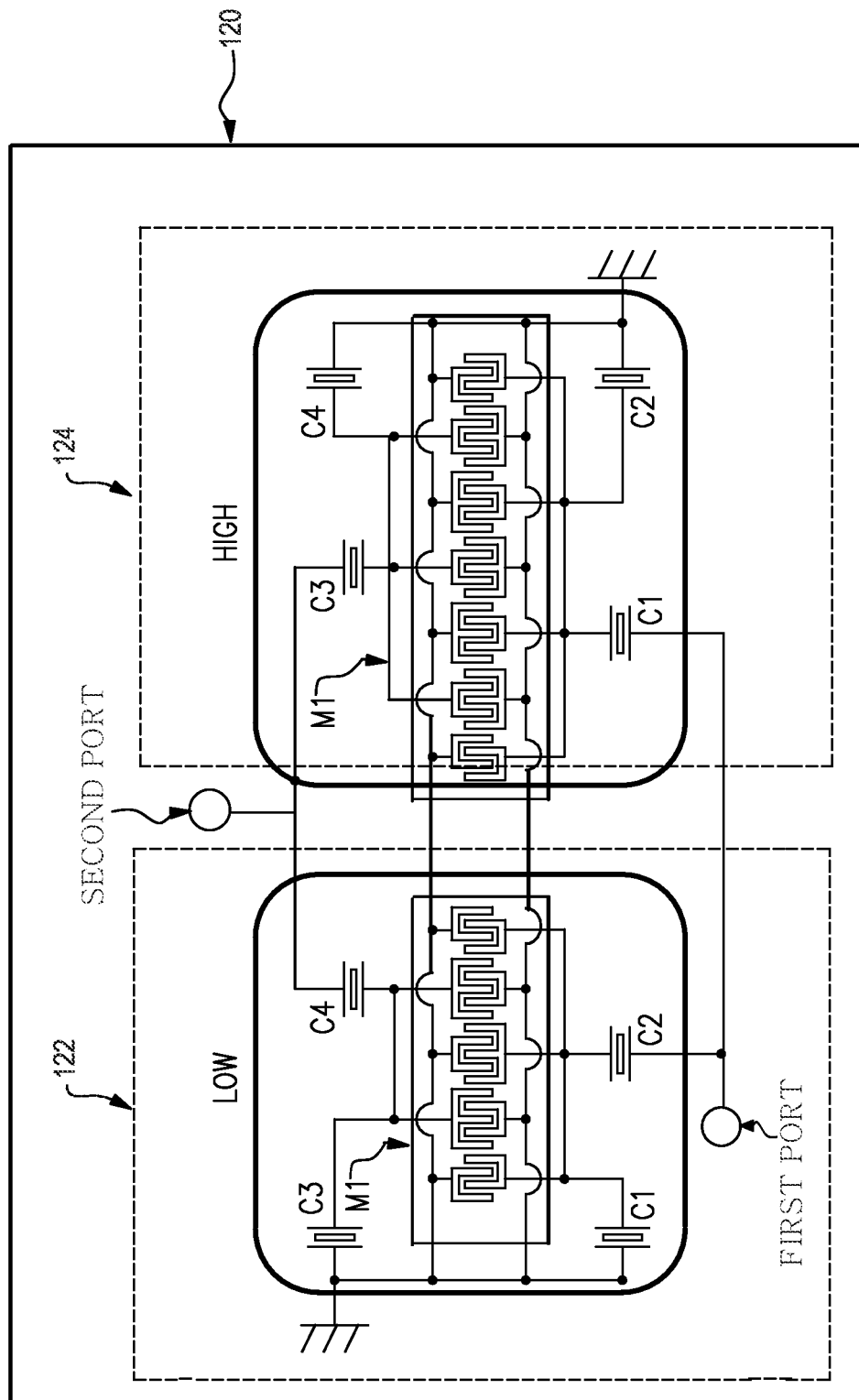
FIG. 2 is a schematic diagram of parallel acoustic wave filters according to an embodiment.

FIG. 2 is a schematic diagram of a parallel acoustic wave filter 120 according to an embodiment. The parallel acoustic wave filter 120 can be implemented in a reduced physical area by having the band pass filters 122 and 124 each have a mismatched impedance frequency region 150 (e.g., as shown in FIG. 1B). Since the impedances of the first and second band pass filters 122 and 124, respectively, are not matched with an antenna over the overlapping frequency region 152, the first band pass filters 122 can have a lower capacitance for acoustic wave resonators C1, C2, C3, and C4 than if the impedance were matched in the overlapping frequency region 152. The second band pass filter 124 can also have a lower capacitance or inductance because the second band pass filter 124 may not be tuned to match its impedance with the antenna over the overlapping frequency region 152.

In FIG. 2, the first band pass filter 122 includes a plurality of acoustic wave resonators C1, C2, C3, and C4 and a MMS filter M1. The MMS filter M1 includes a plurality of plurality of interdigital transduce electrodes that are longitudinally coupled to each other and acoustic reflectors on opposing sides of the plurality of interdigital transducer electrodes. The acoustic wave resonators C1 and C2 are arranged in a ladder topology between the MMS filter M1 and a first port of the first band pass filter 122. The acoustic wave resonator C1 is a shunt resonator, and the acoustic wave resonator C2 is a series resonator. The acoustic wave resonators C3 and C4 are arranged in a ladder topology between the MMS filter M1 and a second port of the first band pass filter 122. The acoustic wave resonator C3 is a shunt resonator, and the acoustic wave resonator C4 is a series resonator.

The acoustic wave resonators C1, C2, C3, and C4 can include any suitable acoustic wave resonators. For example, the acoustic wave resonators C1, C2, C3, and C4 can include one or more surface acoustic wave (SAW) resonators (e.g., one or more temperature compensated SAW resonators, one or more non-temperature compensated SAW resonators, and/or one or more multilayer piezoelectric substrate (MPS) SAW resonators), one or more BAW resonators (e.g., one or more film bulk acoustic wave resonators (FBARs) and/or one or more BAW solidly mounted resonators (SMRs), one or more Lamb wave resonators, one or more boundary wave resonators, or the like. In an embodiment, the first band pass filter 122 can include the MMS filter M1 and the acoustic wave resonators C1, C2, C3, and C4 can be SAW resonators, such as temperature compensated SAW resonators.

The second band pass filter 124 includes a plurality of acoustic wave resonators C1, C2, C3, and C4 and a M.M.S. filter M1 in FIG. 2. The second band pass filter 124 has a higher passband than the first band pass filter 122, and the passbands of the band pass filters 122 and 124 overlap with each other.

The first band pass filter 122 with the lower passband can have smaller capacitance and smaller area than the second band pass filter 124 with the higher passband in the parallel acoustic wave filter 120. Table 1 includes example capacitances in picofarads (pF) for acoustic wave resonators C1 to C4 and input and output nodes of the MMS filter M1 for the first band pass filter 122 and the second band pass filter 124. With these capacitance values, the first band pass filter 122 has a smaller physical area than the first band pass filter 122.

TABLE 1

| Filter | Capacitance in pF | | | | | | |
|---|---|---|---|---|---|---|---|
| | MMS In | MMS Out | C1 | C2 | C3 | C4 | Average |
| First Band Pass Filter 122 | 1.34 | 1.60 | 1.89 | 0.63 | 1.36 | 1.15 | 1.33 |

TABLE 1-continued

| Filter | Capacitance in pF | | | | | | |
|---|---|---|---|---|---|---|---|
| | MMS In | MMS Out | C1 | C2 | C3 | C4 | Average |
| Second Band Pass Filter 124 | 2.67 | 2.77 | 0.83 | 1.88 | 0.83 | 1.88 | 1.88 |

Figure 3A:
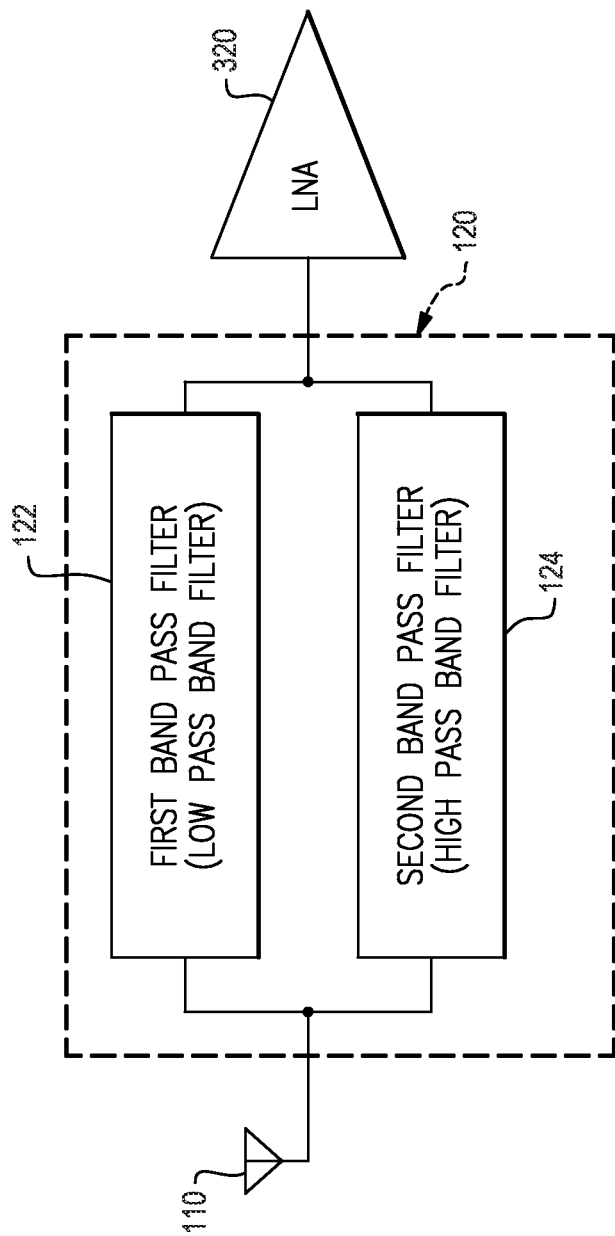
FIG. 3A is an embodiment of a radio frequency system that includes a parallel acoustic wave filter according to an embodiment.
Figure 3B:
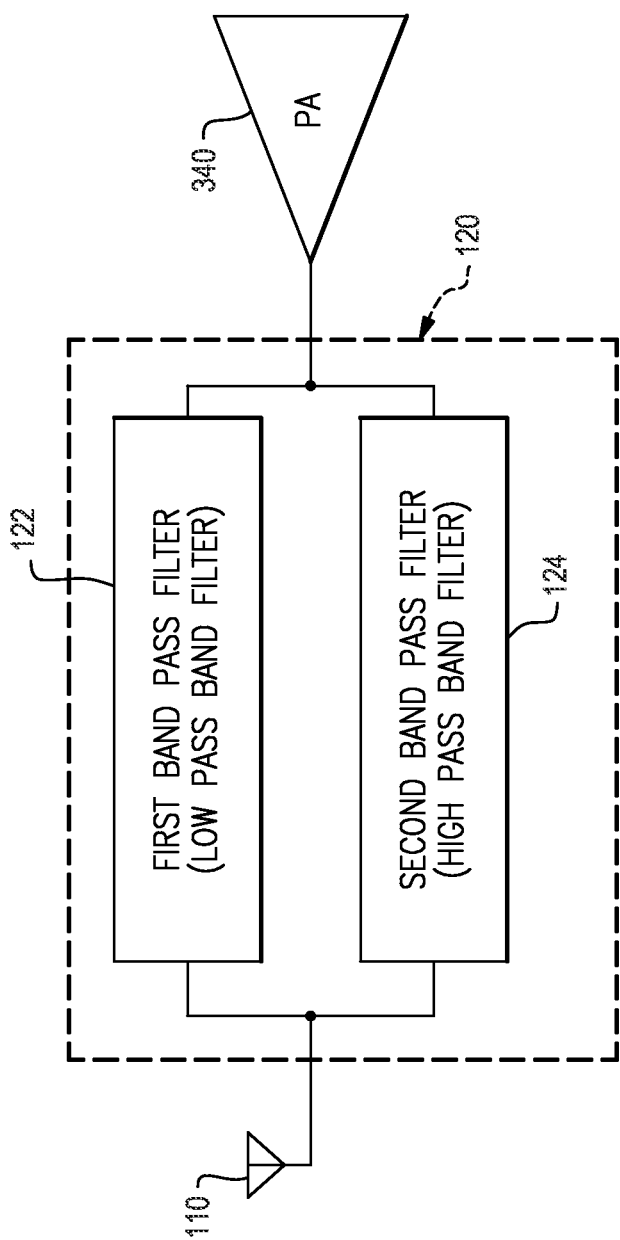
FIG. 3B is an embodiment of another radio frequency system that includes a parallel acoustic wave filter according to an embodiment.

FIGS. 3A and 3B are schematic diagrams of radio frequency systems that include a parallel acoustic wave filter 120 according to embodiments. As shown in FIG. 3A, the parallel acoustic wave filter 120 can be in a signal path between an antenna 110 and a low noise amplifier 320. The parallel acoustic wave filter 120 can be a receive filter. A radio frequency signal received from the antenna 110 can be filtered by the parallel acoustic wave filter 120 and provided to the low noise amplifier 320. The low noise amplifier 320 can amplify the received radio frequency signal. One or more intervening circuit elements can be included between the parallel acoustic wave filter 120 and the low noise amplifier 320 in certain applications. One or more intervening circuit elements can be included between the parallel acoustic wave filter 120 and the antenna 110 in various applications.

As shown in FIG. 3B, the parallel acoustic wave filter 120 can be in a signal path between a power amplifier 340 and the antenna 110. The parallel acoustic wave filter 120 can be a transmit filter. A radio frequency signal generated by the power amplifier 340 can be filtered by the parallel acoustic wave filter 120 and provided to the antenna 110 for wireless transmission. One or more intervening circuit elements can be included between the power amplifier 340 and the parallel acoustic wave filter 120 in certain applications. One or more intervening circuit elements can be included between the parallel acoustic wave filter 120 and the antenna 110 in various applications.

Figure 4:
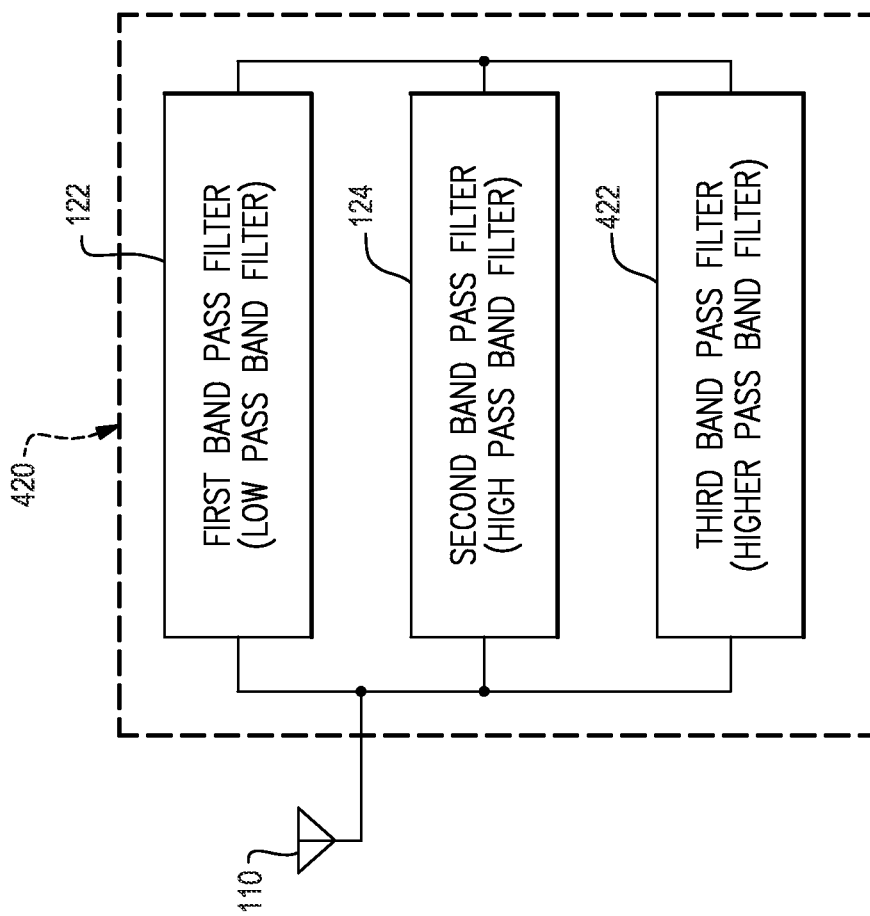
FIG. 4 is a schematic diagram of an embodiment that includes three parallel acoustic wave filters.

FIG. 4 is a schematic diagram that illustrates a parallel acoustic wave filter 420 that includes three acoustic wave filters connected in parallel with each other according to an embodiment. The parallel acoustic wave filter 420 includes a third band pass filter 422 that is connected in parallel with the first band pass filter 122 and the second band pass filter 124. In the parallel acoustic wave filter 420, the third band pass filter 422 has a center frequency that is higher than the center frequency of the second band pass filter 124. The passband of the third band pass filter 422 can overlap with and extend above the passband of the second band pass filter 124. The parallel acoustic wave filters 420 with three band pass filters can have wider passband than having two band pass filters. Any suitable principles and advantages disclosed herein can be implemented in a parallel acoustic wave filter that includes three or more acoustic wave band pass filters connected in parallel with each other.

Figure 5:
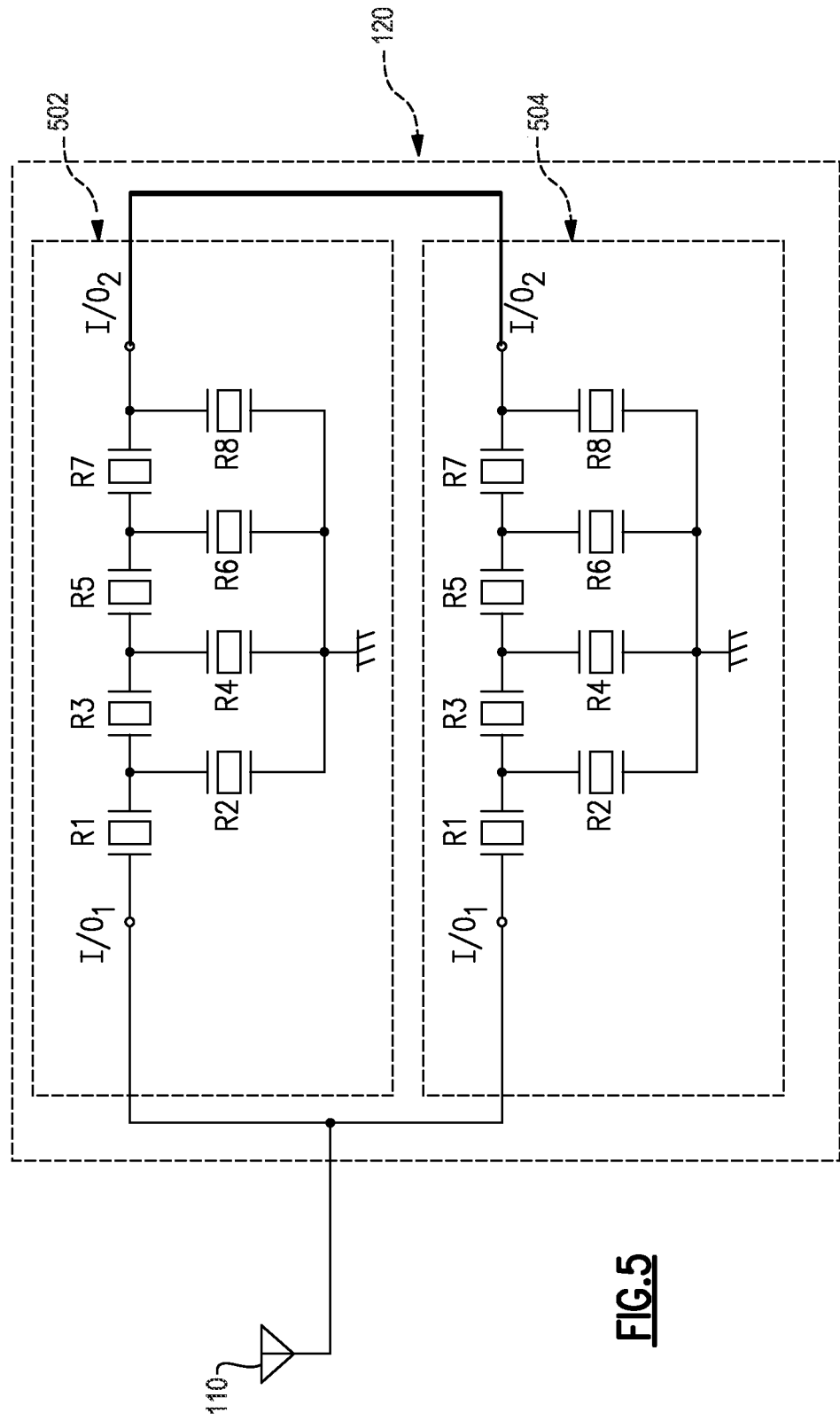
FIG. 5 is a schematic diagram of an embodiment of parallel acoustic wave filters that each include a ladder filter topology.

In some embodiments, the parallel acoustic wave filter 120 can include ladder type acoustic wave filters connected in parallel with each other. As shown in FIG. 5, the parallel acoustic wave filter 120 can include first and second ladder filters 502 and 504 connected in parallel with each other. The first ladder filter 502 can have a lower passband than the second ladder filter 504. An overlapping frequency region (e.g., overlapping frequency region 152 of FIG. 1B) can be between center frequencies of the first and second ladder filters 502, 504. In the overlapping frequency region, the impedances of the first and second ladder filters 502, 504 are mismatched with an antenna.

As illustrated, each of the ladder filters 502 and 504 includes a plurality of series acoustic wave resonators R1, R3, R5, and R7 and a plurality of shunt acoustic wave resonators R2, R4, R6, and R8 coupled between input/output ports I/O$_1$ and I/O$_2$. Any suitable number of series acoustic wave resonators and any suitable number of shunt acoustic wave resonators can be included in a ladder filter. Although the first ladder filter 502 and the second ladder filter 504 are illustrated as including the same number of acoustic wave resonators, parallel acoustic wave filters can include a different number of acoustic wave resonators than each other in some other applications. The acoustic wave resonators of the ladder filter 502 and/or 504 can includes any suitable type of acoustic wave resonators, such as one or more SAW resonators and/or one or more BAW resonators. Although ladder filter topologies are shown in FIG. 5, any other suitable filter topology can be implemented with any suitable principles and advantages disclosed herein, such as a lattice filter topology or a hybrid ladder lattice filter topology.

Parallel acoustic wave filters can have mismatched impedances in a region of interest (e.g., overlap region for passbands or stop bands) where their frequency responses are combined to create a combined frequency response to pass or block a signal within a frequency range for the parallel acoustic wave filter (e.g., combined passband or combined stop band).

Although embodiments of parallel acoustic wave filters discussed herein relate to band pass filters, any suitable principles and advantages of parallel acoustics wave filters discussed herein can be applied to band stop filters. Band stop filters can alternatively be referred to as band reject filters. The parallel acoustic wave filters can each be arranged as a band stop filter where the stop bands of the parallel acoustic wave filters can overlap in frequency. By including two acoustic wave band stop filters in parallel with each other, a stop band of the parallel acoustic wave filters can be increased relative to a stop band of an individual one of the parallel acoustic wave filters. The parallel acoustic wave filters can have impedances that are mismatches in the overlap region of their stop bands. This can enable the parallel acoustic wave band stop filters to be implemented in less area than if their impedances in the overlap region were matched. The band stop filter with the lower stop band can have a higher impedance, lower average resonator capacitance, and smaller area than the band stop filter with the higher stop band in the overlap region in the parallel band stop filter.

Acoustic wave filters disclosed herein can be implemented in a variety of packaged modules. Some example packaged modules will now be discussed in which any suitable principles and advantages of the acoustic wave filters disclosed herein can be implemented. Example packaged modules include one or more acoustic wave filters and one or more radio frequency amplifiers (e.g., one or more power amplifiers and/or one or more low noise amplifiers) and/or one or more radio frequency switches. The example packaged modules can include a package that encloses the illustrated circuit elements. The illustrated circuit elements can be disposed on a common packaging substrate. The packaging substrate can be a laminate substrate, for example.

Figure 6:
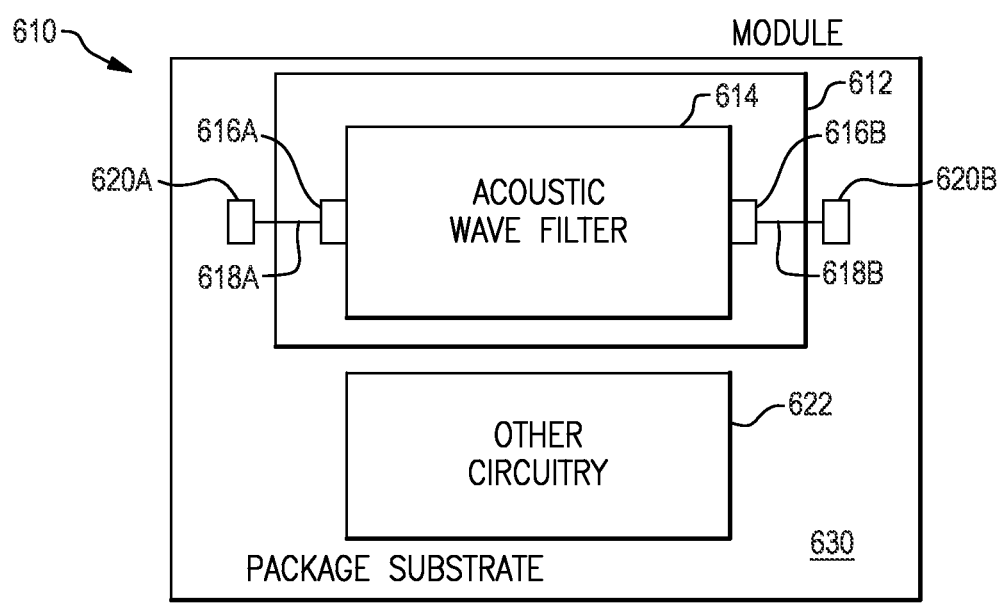
FIG. 6 is a schematic block diagram of an illustrative packaged module according to an embodiment.

FIG. 6 is a schematic diagram of a radio frequency module 610 that includes an acoustic wave component 612 according to an embodiment. The illustrated radio frequency module 610 includes the acoustic wave component 612 and other circuitry 622. The acoustic wave component 612 can include one or more parallel acoustic wave filter in accordance with any suitable combination of features disclosed herein. The acoustic wave component 612 can include an acoustic wave die that includes acoustic wave devices.

The acoustic wave component 612 shown in FIG. 6 includes a filter 614 and terminals 616A and 616B. The filter 614 can include a plurality of acoustic wave band pass filters connected in parallel with each other in accordance with any suitable principles and advantages disclosed herein. The terminals 616A and 616B can serve, for example, as an input contact and an output contact. The acoustic wave component 612 and the other circuitry 622 are on a common packaging substrate 630 in FIG. 6. The packaging substrate 630 can be a laminate substrate. The terminals 616A and 616B can be electrically connected to contacts 620A and 620B, respectively, on the packaging substrate 630 by way of electrical connectors 618A and 618B, respectively. The electrical connectors 618A and 618B can be bumps or wire bonds, for example.

The other circuitry 622 can include any suitable additional circuitry. The other circuitry 622 can include radio frequency circuitry. For example, the other circuitry can include one or more radio frequency amplifiers (e.g., one or more power amplifiers and/or one or more low noise amplifiers), one or more power amplifiers, one or more radio frequency switches, one or more additional filters, one or more low noise amplifiers, one or more RF couplers, one or more delay lines, one or more phase shifters, other radio frequency front end circuitry, the like, or any suitable combination thereof. The other circuitry 622 can be electrically connected to the filter 614. The radio frequency module 610 can include one or more packaging structures to, for example, provide protection and/or facilitate easier handling of the radio frequency module 610. Such a packaging structure can include an overmold structure formed over the packaging substrate 630. The overmold structure can encapsulate some or all of the components of the radio frequency module 610.

Figure 7:
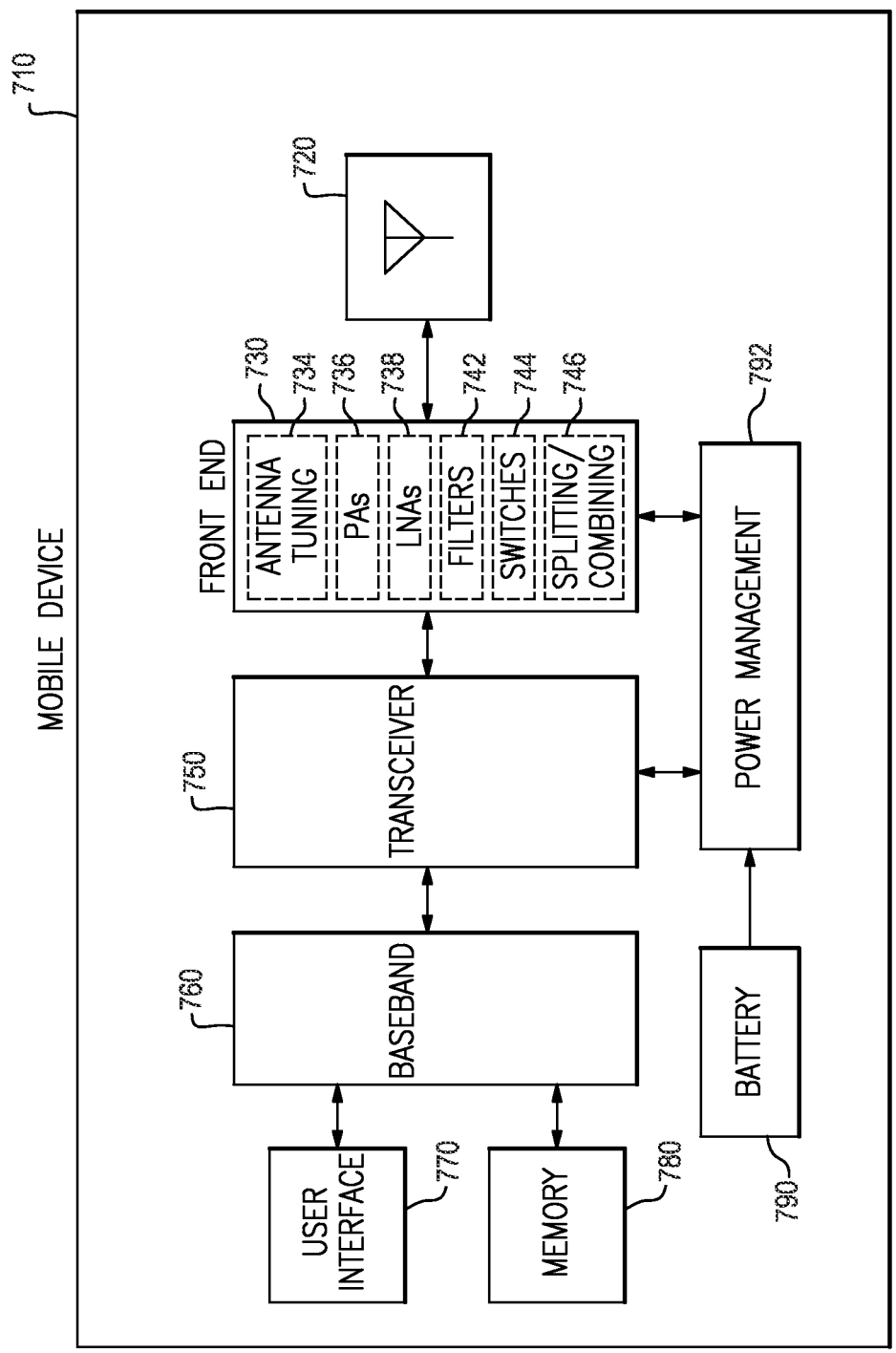
FIG. 7 is a schematic diagram of one embodiment of a mobile device.

Acoustic wave filters disclosed herein can be implemented in a variety of wireless communication devices, such as mobile devices. One or more filters with any suitable implemented with any suitable principles and advantages disclosed herein can be included in a variety of wireless communication devices, such as mobile phones. The acoustic wave filters can be included in a radio frequency front end. FIG. 7 is a schematic diagram of one embodiment of a mobile device 710. The mobile device 710 includes a baseband system 760, a transceiver 750, a front end system 730, antennas 720, a power management system 792, a memory 780, a user interface 770, and a battery 790.

The mobile device 710 can be used communicate using a wide variety of communications technologies, including, but not limited to, second generation (2G), third generation (3G), fourth generation (4G) (including LTE, LTE-Advanced, and LTE-Advanced Pro), fifth generation (5G) New Radio (N.R.), wireless local area network (WLAN) (for instance, WiFi), wireless personal area network (WPAN) (for instance, Bluetooth and ZigBee), WMAN (wireless metropolitan area network) (for instance, WiMax), Global Positioning System (G.P.S.) technologies, or any suitable combination thereof.

The transceiver 750 generates RF signals for transmission and processes incoming RF signals received from the antennas 720. It will be understood that various functionalities associated with the transmission and receiving of RF signals can be achieved by one or more components that are collectively represented in FIG. 7 as the transceiver 750. In one example, separate components (for instance, separate circuits or dies) can be provided for handling certain types of RF signals.

The front end system 730 aids in conditioning signals transmitted to and/or received from the antennas 720. In the illustrated embodiment, the front end system 730 includes antenna tuning circuitry 734, power amplifiers (P.A.s) 736, low noise amplifiers (L.N.A.s) 738, filters 742, switches 744, and signal splitting/combining circuitry 746. However, other implementations are possible. One or more of the filters 742 can be implemented in accordance with any suitable principles and advantages disclosed herein. For example, one or more of the filters 742 can include parallel acoustic wave filters in accordance with any suitable principles and advantages disclosed herein.

The front end system 730 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or any suitable combination thereof.

In certain implementations, the mobile device 710 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 720 can include antennas used for a wide variety of types of communications. For example, the antennas 720 can include antennas for transmitting and/or receiving signals associated with a wide variety of frequencies and communications standards.

In certain implementations, the antennas 720 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 710 can operate with beamforming in certain implementations. For example, the front end system 730 can include amplifiers having controllable gain and phase shifters having controllable phase to provide beam formation and directivity for transmission and/or reception of signals using the antennas 720. For example, in the context of signal transmission, the amplitude and phases of the transmit signals provided to the antennas 720 are controlled such that radiated signals from the antennas 720 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 720 from a particular direction. In certain implementations, the antennas 720 include one or more arrays of antenna elements to enhance beamforming.

The baseband system 760 is coupled to the user interface 770 to facilitate processing of various user input and output (I/O), such as voice and data. The baseband system 760 provides the transceiver 750 with digital representations of transmit signals, which the transceiver 750 processes to generate RF signals for transmission. The baseband system 760 also processes digital representations of received signals provided by the transceiver 750. As shown in FIG. 7, the baseband system 760 is coupled to the memory 780 to facilitate operation of the mobile device 710.

The memory 780 can be used for a wide variety of purposes, such as storing data and/or instructions to facilitate the operation of the mobile device 710 and/or to provide storage of user information.

The power management system 792 provides a number of power management functions of the mobile device 710. In certain implementations, the power management system 792 includes a P.A. supply control circuit that controls the supply voltages of the power amplifiers 736. For example, the power management system 792 can be configured to change the supply voltage(s) provided to one or more of the power amplifiers 736 to improve efficiency, such as power added efficiency (P.A.E.).

As shown in FIG. 7, the power management system 792 receives a battery voltage from the battery 790. The battery 790 can be any suitable battery for use in the mobile device 710, including, for example, a lithium-ion battery.

Technology disclosed herein can be implemented in acoustic wave filters in 5G applications. 5G technology is also referred to herein as 5G New Radio (N.R.). 5G N.R. supports and/or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein can be applied to a standalone filter in some applications. The teachings herein can be applied to one or more filters in a multiplexer that includes a plurality of filters coupled to each other at a common node.

The teachings herein are applicable to a wide variety of communication systems, including, but not limited to, communication systems using advanced cellular technologies, such as LTE-Advanced, LTE-Advanced Pro, and/or 5G NR. A filter including any suitable combination of features disclosed herein be arranged to filter a radio frequency signal in a 5G NR operating band within Frequency Range 1 (FR1). A filter arranged to filter a radio frequency signal in a 5G NR operating band can be implemented in accordance with any suitable principles and advantages disclosed herein. The filter can be arranged to filter signals within FR1 and having a frequency below 5 GHz. The filter can be arranged to filter signals within FR1 and having a frequency below 3.5 GHz. FR1 can be from 410 MHz to 7.125 GHz, for example, as specified in a current 5G NR specification. One or more acoustic wave filters in accordance with any suitable principles and advantages disclosed herein can filter a radio frequency signal in a fourth generation (4G) Long Term Evolution (LTE). An acoustic wave filter in accordance with any suitable principles and advantages disclosed herein can be included in a filter having a passband that includes a 4G LTE operating band and a 5G NR operating band. Such a filter can be implemented in a dual connectivity application, such as an E-UTRAN New Radio-Dual Connectivity (ENDC) application. Acoustic wave filters disclosed herein can advantageously implement relatively wide passbands for certain 5G applications.

Figure 8:
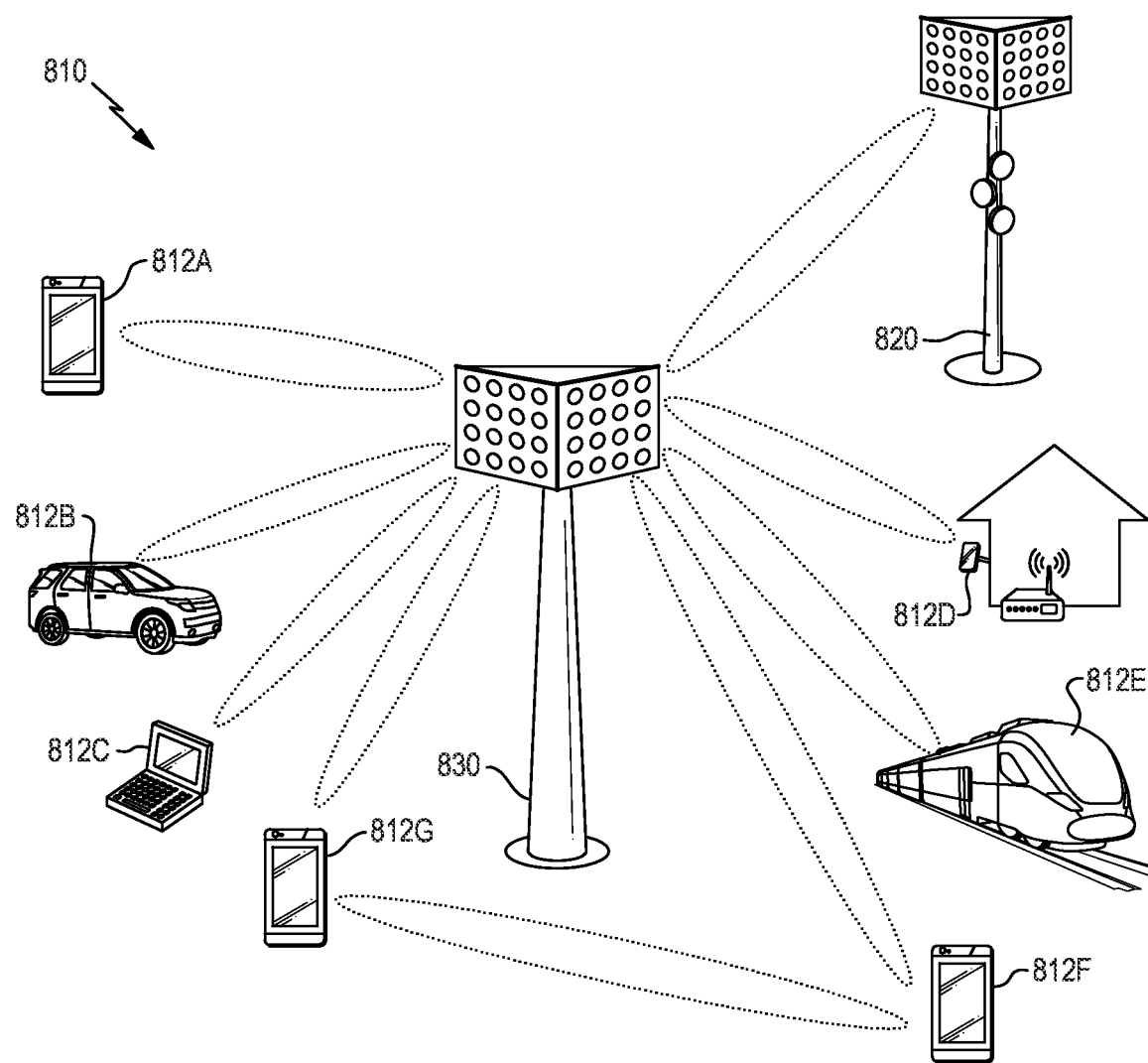
FIG. 8 is a schematic diagram of one example of a communication network.

FIG. 8 is a schematic diagram of one example of a communication network 810. The communication network 810 includes a macro cell base station 830, a small cell base station 820, and various examples of user equipment (UE), including a first mobile device 812A, a wireless-connected car 812B, a laptop 812C, a stationary wireless device 812D, a wireless-connected train 812E, a second mobile device 812F, and a third mobile device 812G. U.E.s are wireless communication devices. One or more of the macro cell base station 830, the small cell base station 820, or UEs illustrated in FIG. 8 can implement one or more of the acoustic wave filters in accordance with any suitable principles and advantages disclosed herein. For example, one or more of the UEs shown in FIG. 8 can include one or more acoustic wave filters in accordance with any suitable principles and advantages disclosed herein.

Although specific examples of base stations and user equipment are illustrated in FIG. 8, a communication network can include base stations and user equipment of a wide variety of types and/or numbers. For instance, in the example shown, the communication network 810 includes the macro cell base station 830 and the small cell base station 820. The small cell base station 820 can operate with relatively lower power, shorter range, and/or with fewer concurrent users relative to the macro cell base station 830. The small cell base station 820 can also be referred to as a femtocell, a picocell, or a microcell. Although the communication network 810 is illustrated as including two base stations, the communication network 810 can be implemented to include more or fewer base stations and/or base stations of other types.

Although various examples of user equipment are shown, the teachings herein are applicable to a wide variety of user equipment, including, but not limited to, mobile phones, tablets, laptops, Internet of Things (IoT) devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 810 of FIG. 8 supports communications using a variety of cellular technologies, including, for example, 4G LTE and 5G N.R. In certain implementations, the communication network 810 is further adapted to provide a wireless local area network (WLAN), such as WiFi. Although various examples of communication technologies have been provided, the communication network 810 can be adapted to support a wide variety of communication technologies.

Various communication links of the communication network 810 have been depicted in FIG. 8. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G N.R. frequencies), with one or more unlicensed carriers (for instance, unlicensed WiFi frequencies).

As shown in FIG. 8, the communication links include not only communication links between U.E. and base stations, but also U.E. to U.E. communications and base station to base station communications. For example, the communication network 810 can be implemented to support self-fronthaul and/or self-backhaul (for instance, as between mobile device 812G and mobile device 812F).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. According to certain implementations, the communication links can serve Frequency Range 1 (FR1), Frequency Range 2 (FR2), or a combination thereof. An acoustic wave filter in accordance with any suitable principles and advantages disclosed herein can filter a radio frequency signal within FR1. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 810 can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 3 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 810 of FIG. 8 can be used to support a wide variety of advanced communication features, including, but not limited to, eMBB, uRLLC, and/or mMTC.

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes example embodiments, the teachings described herein can be applied to a variety of structures. Any of the principles and advantages discussed herein can be implemented in association with RF circuits configured to process signals having a frequency in a range from about 30 kHz to 300 GHz, such as in a frequency range from about 450 MHz to 3.5 GHz, a frequency range from about 450 MHz to 3.5 GHz, in a frequency range from about 400 MHz to 8.5 GHz, or in a frequency range from about 734 MHz to 8.5 GHz.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, a camera such as a digital camera, a portable memory chip, a home appliance such as a washer or a dryer, a peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel filters, devices, modules, radio frequency systems, wireless communication devices, apparatus, methods, and systems described herein may be embodied in a variety of other forms. Furthermore, various omissions, substitutions and changes in the form of the filters, multiplexer, devices, modules, radio frequency systems, wireless communication devices, apparatus, methods, and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency system comprising:
an antenna;
a radio frequency amplifier;
a first acoustic wave filter having a first passband and a first acoustic wave resonator area, the first acoustic wave filter being in a signal path between the antenna and the radio frequency amplifier; and
a second acoustic wave filter having a second passband and a second acoustic wave resonator area, the second acoustic wave filter being in parallel with the first acoustic wave filter, the second passband including frequencies above the first passband, the first passband and the second passband overlapping in an overlap band, the first acoustic wave filter having a higher impedance in the overlap band than the second acoustic wave filter, and the first acoustic wave resonator area being smaller than the second acoustic wave resonator area.

2. The radio frequency system of claim 1 wherein the radio frequency amplifier is a low noise amplifier.

3. The radio frequency system of claim 1 wherein the radio frequency amplifier is a power amplifier.

4. The radio frequency system of claim 1 wherein the first acoustic wave filter includes a multimode surface acoustic wave filter and a plurality of acoustic wave resonators.

5. The radio frequency system of claim 4 wherein the plurality of acoustic wave resonators includes a surface acoustic wave resonator.

6. The radio frequency system of claim 1 wherein the first acoustic wave filter includes a bulk acoustic wave resonator.

7. The radio frequency system of claim 1 wherein the first acoustic wave filter includes a surface acoustic wave resonator.

8. The radio frequency system of claim 1 wherein at least one of the first passband or the second passband is associated with a Global Positioning System frequency band.

9. The radio frequency system of claim 1 further comprising a third acoustic wave filter in parallel with the first and second acoustic wave filters, the third acoustic wave filter having a third passband that overlaps with the second passband.

10. The radio frequency system of claim 1 wherein the second acoustic wave filter includes second acoustic wave resonators having greater combined capacitance than first acoustic wave resonators of the first acoustic wave filter.

11. A wireless communication device comprising:
an antenna;
a radio frequency amplifier;
a transceiver in communication with the radio frequency amplifier;
a first acoustic wave filter having a first passband and a first acoustic wave resonator area, the first acoustic wave filter being in a signal path between the antenna and the radio frequency amplifier; and
a second acoustic wave filter having a second passband and a second acoustic wave resonator area, the second acoustic wave filter being in parallel with the first acoustic wave filter, the second passband including frequencies above the first passband, the first passband and the second passband overlapping in an overlap band, the first acoustic wave filter having a higher impedance in the overlap band than the second acoustic wave filter, and the first acoustic wave resonator area being smaller than the second acoustic wave resonator area.

12. The wireless communication device of claim 11 wherein the wireless communication device is a mobile phone.

13. The wireless communication device of claim 11 wherein the wireless communication device is configured to transmit a fifth generation New Radio signal from the antenna.

14. The wireless communication device of claim 11 wherein the wireless communication device is configured to implement dual connectivity.

15. The wireless communication device of claim 11 wherein the first acoustic wave filter and the second acoustic wave filter are configured to filter a Global Positioning System signal received by the antenna.

16. The wireless communication device of claim 11 wherein the first acoustic wave filter includes a multimode surface acoustic wave filter and a plurality of acoustic wave resonators.

17. A method of filtering a radio frequency signal, the method comprising:
receiving a radio frequency signal at an antenna of a radio frequency system; and
filtering the radio frequency signal with a first acoustic wave filter and a second acoustic wave filter that are in parallel with each other, the first acoustic wave filter having a first passband and a first acoustic wave resonator area, the second acoustic wave filter having a second passband and a second acoustic wave resonator area, the second passband including frequencies above the first passband, the first passband and the second passband overlapping in an overlap band, the first acoustic wave filter having a higher impedance in the overlap band than the second acoustic wave filter, and the first acoustic wave resonator area being smaller than the second acoustic wave resonator area.

18. The method of claim 17 wherein the method is performed in a mobile phone.

19. The method of claim 17 wherein the radio frequency signal is a Global Positioning System signal.

20. The method of claim 19 further comprising transmitting a fifth generation New Radio signal from the antenna.

\* \* \* \* \*